(12) United States Patent
Suwald

(10) Patent No.: US 10,659,213 B2
(45) Date of Patent: May 19, 2020

(54) BIOMETRIC SENSING SYSTEM

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/034,352

(22) Filed: Jul. 13, 2018

(65) Prior Publication Data

US 2019/0020462 A1 Jan. 17, 2019

(51) Int. Cl.
*H04L 5/16* (2006.01)
*G06F 13/42* (2006.01)

(52) U.S. Cl.
CPC ............ *H04L 5/16* (2013.01); *G06F 13/4291* (2013.01)

(58) Field of Classification Search
CPC .............................. H04L 5/16; G06F 13/4291
See application file for complete search history.

(56) References Cited

U.S. PATENT DOCUMENTS

| | | | |
|---|---|---|---|
| 9,042,274 B2 | 5/2015 | Peichl et al. | |
| 2002/0044535 A1* | 4/2002 | Tabata | H04B 1/56 |
| 2007/0023662 A1* | 2/2007 | Brady | G01J 5/00 |
| 2009/0228714 A1 | 9/2009 | Fiske et al. | |
| 2016/0232517 A1* | 8/2016 | Gardiner | G06Q 20/341 |
| 2017/0104733 A1 | 4/2017 | Thanigasalam | |
| 2017/0228631 A1* | 8/2017 | Larsen | G06K 19/07354 |

OTHER PUBLICATIONS

Foust, K. "A Developer's Guide to MIPI I3C Implementation: MIPI DevCon 2016", mipi DEVCON, 1 pg., retrieved from the internet Feb. 17, 2017 at: url:https://www.youtube.com/watch?v=cL1rhfqHj88 (Sep. 2016).

"Whiteboard Wednesdays—Advantages of the MIPI I3C Interface", Cadence Design Systems, 1 pg., retrieved from the internet Sep. 11, 2017 at: URL:https://www.youtube.com/watch?v=K8LjIEC3UEo (Jun. 1, 2016).

"I²C", Wikipedia, 14 pgs., retrieved from the internet Sep. 11, 2017 at: url:https://en.wikipedia.org/w/index.php?title=I2C&oldid=785951469 (Jun. 16, 2017).

"Introduction to the MIPI I3C Standardized Sensor Interface", mipi alliance, MEMS and Sensors Whitepaper Series, 11 pgs., retrieved from the internet at: https://cdn2.hubspot.net/hubfs/2384176/MIPI_Alliance_I3C_Whitepaper.pdf (Aug. 2016).

"Serial Peripheral Interface Bus", Wikipedia, 14 pgs., retrieved from the internet Sep. 11, 2017 at: https://en.wikipedia.org/w/index.php?title=Serial_Peripheral_Interface_Bus&oldid=789967215 (Jul. 10, 2017).

Extended European Search Report for Patent Appln. No. 17181138.3 (dated Sep. 21, 2017).

* cited by examiner

*Primary Examiner* — Ronald B Abelson

(57) ABSTRACT

In accordance with a first aspect of the present disclosure, a biometric sensing system is provided, comprising a sensor module; a processing unit communicatively coupled to the sensor module; wherein the sensor module and the processing unit are configured to communicate with each other in a half-duplex mode of communication. In accordance with a second aspect of the present disclosure, a method of communicating between a sensor module and a processing unit in a biometric sensing system is conceived, wherein the sensor module and the processing unit communicate with each other in a half-duplex mode of communication. In accordance with a third aspect of the present disclosure, a corresponding computer program is provided.

13 Claims, 7 Drawing Sheets

US 10,659,213 B2

BIOMETRIC SENSING SYSTEM

CROSS-REFERENCE TO RELATED APPLICATIONS

This application claims the priority under 35 U.S.C. § 119 of European patent application no. 17181138.3, filed on Jul. 13, 2017, the contents of which are incorporated by reference herein.

FIELD

The present disclosure relates to a biometric sensing system. Furthermore, the present disclosure relates to a method of communicating between a sensor module and a processing unit in a biometric sensing system, and to a corresponding computer program. Today, electronic devices such as smart cards are widely used in society. For example, smart cards may be used as electronic identity (eID) cards and payment cards (e.g., bank cards). Although these cards are relatively secure due to their cryptographic capabilities, they are usually not equipped with a user interface suitable for entering user credentials, i.e. a so-called "authentication interface". As a consequence, most card users still enter their PIN code through personal computers and laptops, which increases the risk that their credentials are intercepted by malicious software such as Trojans and key-logger programs. Some smart cards have been equipped with embedded touch-based user interfaces or sensor modules. An example of such a sensor module is a fingerprint sensor. However, it may be challenging to implement a simple, high-bandwidth interface between such a sensor module and processing components of the card (e.g., a microcontroller). The same challenge may exist for touch-based interfaces that are embedded in other types of electronic devices, such as Internet-of-Things (IoT) devices and wearable devices.

SUMMARY

In accordance with a first aspect of the present disclosure, a biometric sensing system is provided, comprising a sensor module; a processing unit communicatively coupled to the sensor module; wherein the sensor module and the processing unit are configured to communicate with each other in a half-duplex mode of communication.

In an embodiment, the sensor module and the processing unit are communicatively coupled to each other via a serial peripheral interface.

In an embodiment, the serial peripheral interface comprises a clock line and a master-output-slave-input line.

In an embodiment, the sensor module and the processing unit are configured to operate in a slave mode by default.

In an embodiment, each of the sensor module and the processing unit is configured to switch to a master mode of operation.

In an embodiment, the duration of the master mode of operation depends on an amount of data to be transmitted.

In an embodiment, each of the sensor module and the processing unit is configured to switch back to the slave mode.

In an embodiment, each of the sensor module and the processing unit is configured to disregard interrupt requests when operating in the master mode.

In an embodiment, the sensor module is configured to operate in the master mode during multiple data transmission cycles.

In an embodiment, each of the sensor module and the processing unit is configured to transmit an interrupt request on a clock line when no communication takes place.

In an embodiment, the processing unit is configured to transmit a reset instruction to the sensor module.

In an embodiment, the processing unit is configured to control the start of a communication.

In an embodiment, a smart card comprises a system of the kind set forth.

In accordance with a second aspect of the present disclosure, a method of communicating between a sensor module and a processing unit in a biometric sensing system is conceived, wherein the sensor module and the processing unit communicate with each other in a half-duplex mode of communication.

In accordance with a third aspect of the present disclosure, a computer program is provided, comprising non-transient executable instructions that, when executed by a sensor module or a processing unit, cause said sensor module and processing unit to carry out a method of the kind set forth.

DESCRIPTION OF DRAWINGS

Embodiments will be described in more detail with reference to the appended drawings, in which.

DESCRIPTION OF EMBODIMENTS

Figure 1:
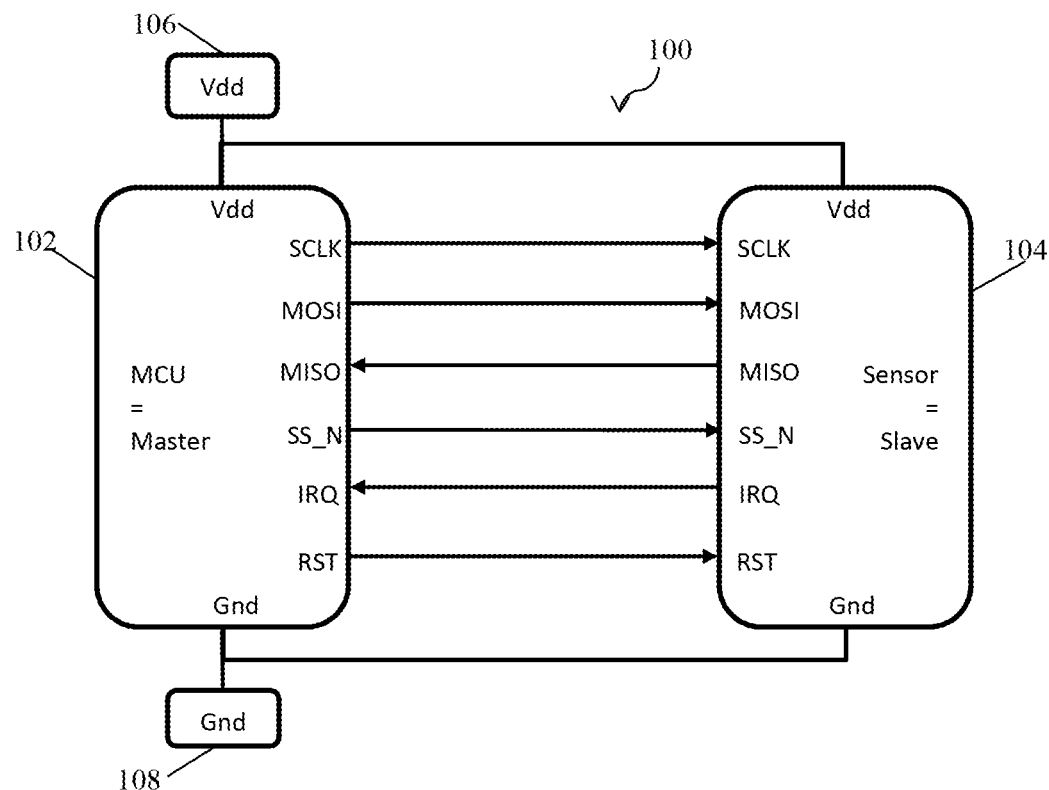
FIG. 1 shows an example of a sensing system.

FIG. 1 shows an example of a sensing system 100. The sensing system 100 comprises a microcontroller 102 that acts as a master device. The microcontroller 102 is an example of a processing unit of the kind set forth. Furthermore, the sensing system 100 comprises a sensor module 104, e.g. a fingerprint sensor, which acts a slave device. Furthermore, both the microcontroller 102 and the sensor module 104 are connected to a supply voltage 106 and to ground 108. The microcontroller 102 and the sensor module 104 are configured to communicate with each other via a serial peripheral interface (SPI). An SPI often comprises at least six communication lines: a serial clock (SCLK) line, a master-output-slave-input (MOSI) line, a master-input-slave-output (MISO) line, a slave select (SS_N) line, an interrupt request (IRQ) line, and a reset (RST) line. A SPI is relatively fast, for example compared to an I²C interface, and it provides full-duplex communication. However, as shown in FIG. 1, a relatively large amount of communication lines or wires is required. It may be difficult to implement such a large amount of wires in some devices. For example, low-cost manufacturing of smart cards utilizes wire-embedding technology to create interconnections between embedded components. Since wire-embedding is a serial manufacturing process the number of interconnections between embedded components has a major impact on the throughput time during the wire-embedding manufacturing step. For that reason, it is desirable to reduce the number of interconnections between the components of a smart card.

Therefore, in accordance with a first aspect of the present disclosure, a biometric sensing system is provided, comprising a sensor module and a processing unit communicatively coupled to the sensor module. Furthermore, the sensor module and the processing unit are configured to communicate with each other in a half-duplex mode of communication. In this way, less communication lines are required between the sensor module and the processing unit. Furthermore, in an embodiment, the sensor module and the processing unit are communicatively coupled to each other via a serial peripheral interface (SPI). In this way, the communication between the sensor module and the processing unit may still be performed at an acceptable speed.

More specifically, if one device is a sensor module that provides bulk data (e.g., fingerprint image data) to a processing unit, then a high bandwidth will be required for sending data from the sensor module to the processing unit, while a low bandwidth will be required for the transmission of data in the other direction. That is to say, the processing unit merely needs to transmit setup- and control-information to the sensor module. The SPI has been developed to provide high bandwidth in both directions, providing full-duplex communication. In a sensing system of the kind set forth, it may be sufficient to provide a high bandwidth only in one direction, i.e. from the sensor module to the processing unit. Thus, the sensor module and the processing unit may communicate with each other in a half-duplex mode of communication. The biometric sensing system may be used to advantage in a smart card, or in any other device in which creating sufficient communication lines presents a challenge IoT devices or wearable devices). The biometric sensing system may be a fingerprint sensing system. It is noted that the sensing system may also be another type of biometric sensing system. For instance, the presently disclosed system and method may be used to advantage in high-bandwidth streaming devices equipped with a face recognition camera, an iris scan camera or a vein pattern camera.

Figure 2:
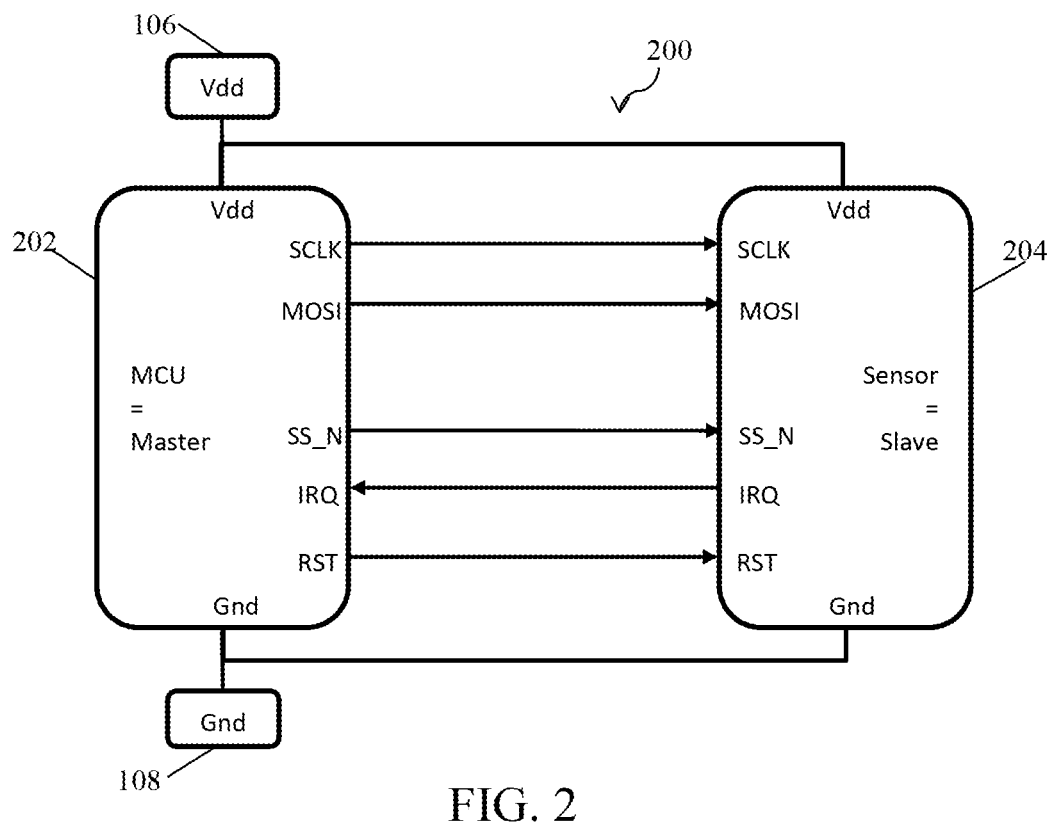
FIG. 2 shows an illustrative embodiment of a sensing system.

FIG. 2 shows an illustrative embodiment of a sensing system 200. The sensing system 200 comprises a microcontroller 202 communicatively coupled to a sensor module 204. Both the microcontroller 202 and the sensor module 204 are connected to a supply voltage 106 and to ground 108. The microcontroller 202 and the sensor module 204 are configured to communicate with each other via a serial peripheral interface (SPI). However, in accordance with the present disclosure, the microcontroller 202 and the sensor module 204 are configured to communicate with each other in a half-duplex mode of communication. Therefore, the MISO line of the SPI may be omitted.

Figure 3:
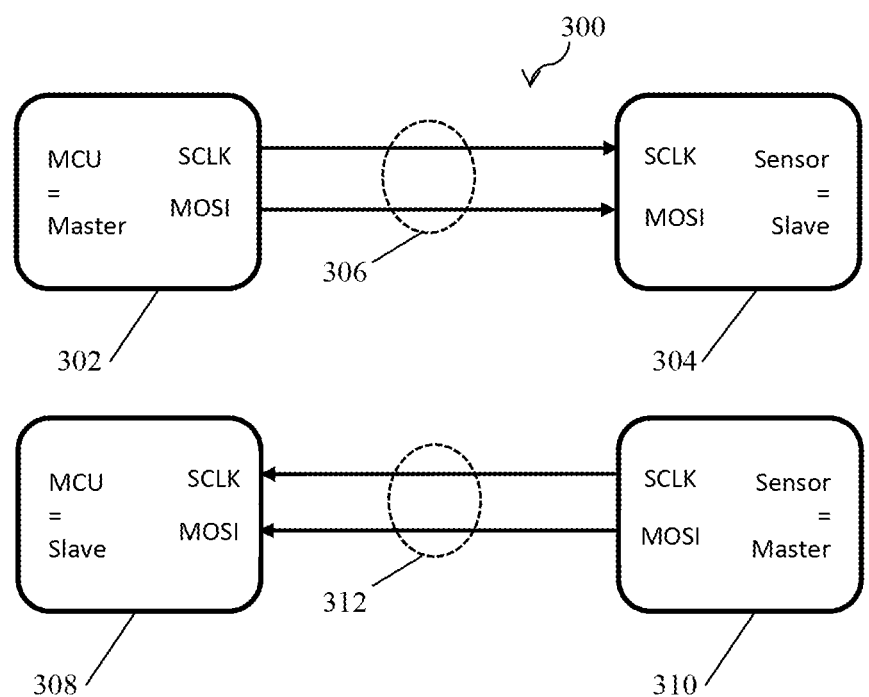
FIG. 3 shows another illustrative embodiment of a sensing system.

FIG. 3 shows another illustrative embodiment of a sensing system 300. In this embodiment, the SPI comprises a clock (SCLK) line and a master-output-slave-input (MOSI) line. As will be explained with reference to the various embodiments herein, the other lines of the SPI may also be omitted. In accordance with the principles of half-duplex communication, data may be transmitted through these lines in two directions, but not simultaneously. Specifically, data may be transmitted in a first direction 306 (i.e., from microcontroller 302 to sensor module 304), and in a second direction 312 (i.e., from sensor module 310 to microcontroller 308). When data is transmitted in the first direction 306, microcontroller 302 acts as a master device, while sensor module 304 acts as a slave device. When data is transmitted in the second direction 312, microcontroller 306 acts as a slave device, while sensor module 310 acts as a master device. Thus, the microcontroller and sensor module may switch roles, so as to enable using only the MOSI line for transmitting data in both directions. Switching roles may be implemented as follows. In an embodiment, the processing unit (i.e., microcontroller) and the sensor module are configured to operate in a slave mode by default. Furthermore, each of the processing unit and the sensor module may be configured to switch to a master mode of operation. It is noted that the processing unit is not necessarily a microcontroller; other processing units may also be used.

Figure 4:
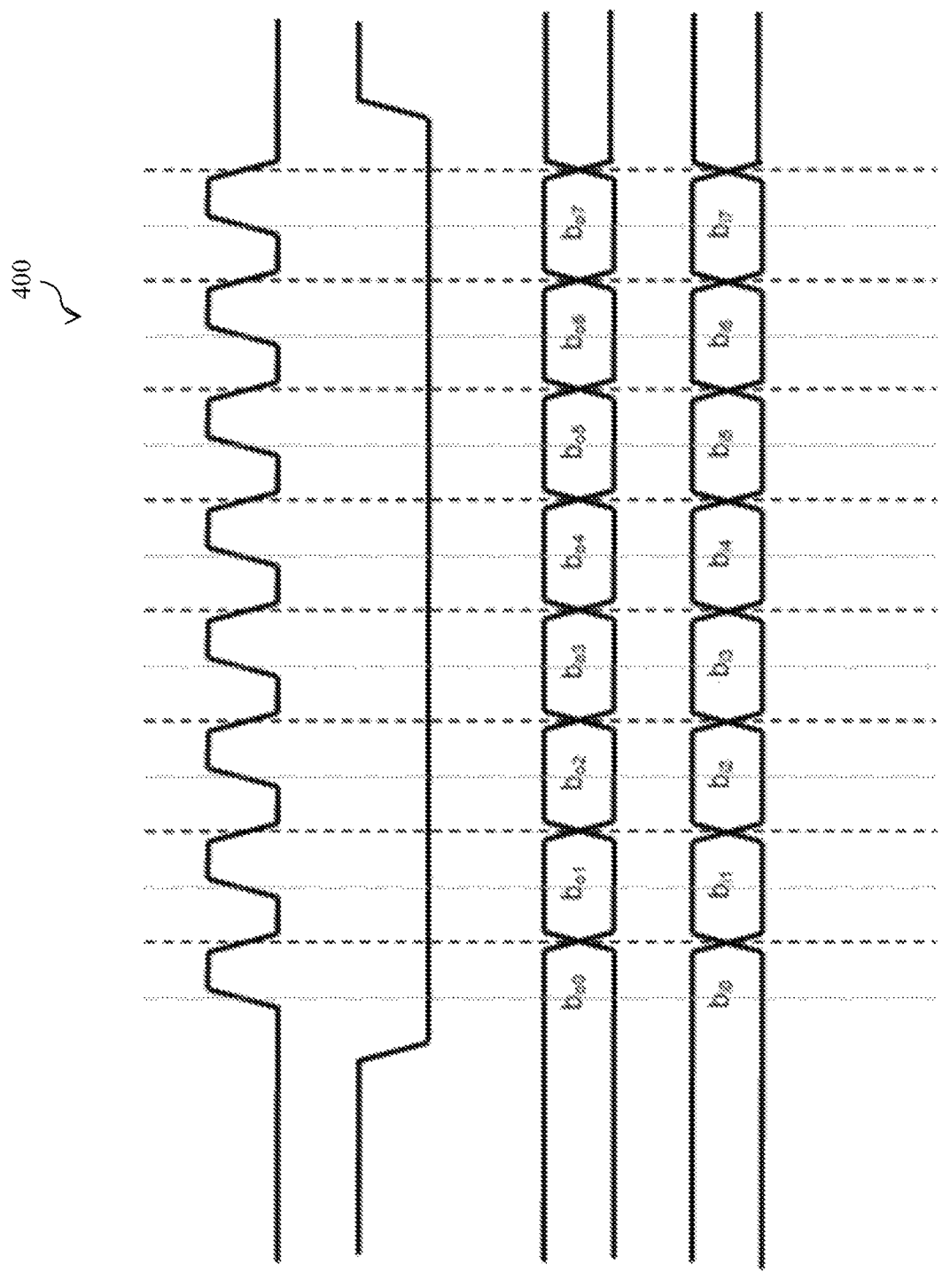
FIG. 4 shows a timing diagram of a serial peripheral interface.

FIG. 4 shows a timing diagram 400 of a serial peripheral interface. In particular, the timing requires a slave device to have a slave select signal SS_N pulled low so as to support slave mode. The communication master may calculate the duration it must stay in master mode based on the amount of data to be communicated. Thus, in an embodiment, the duration of the master mode depends on an amount of data to be transmitted. Thereby, the processing unit or the sensor module—as the case may be—does not remain in the master mode longer than necessary. Furthermore, the processing unit and the sensor module may be configured to switch back to the slave mode, thereby allowing another device to enter into the master mode.

As mentioned above, by default both devices may operate in a slave mode. In this mode, the clock line connections of both devices are in input-mode (tri-state). As shown in FIG. 4 the clock (SCLK) line is only utilized when communication takes place. For that reason, the SCLK line may be used to communicate an interrupt request from one device to the other device when no communication takes place. Thus, in an embodiment, each of the sensor module and the processing unit is configured to transmit an interrupt request on the clock line when no communication takes place. In this way, the dedicated interrupt request (IRQ) line shown in FIG. 1 may also be omitted.

Figure 5:
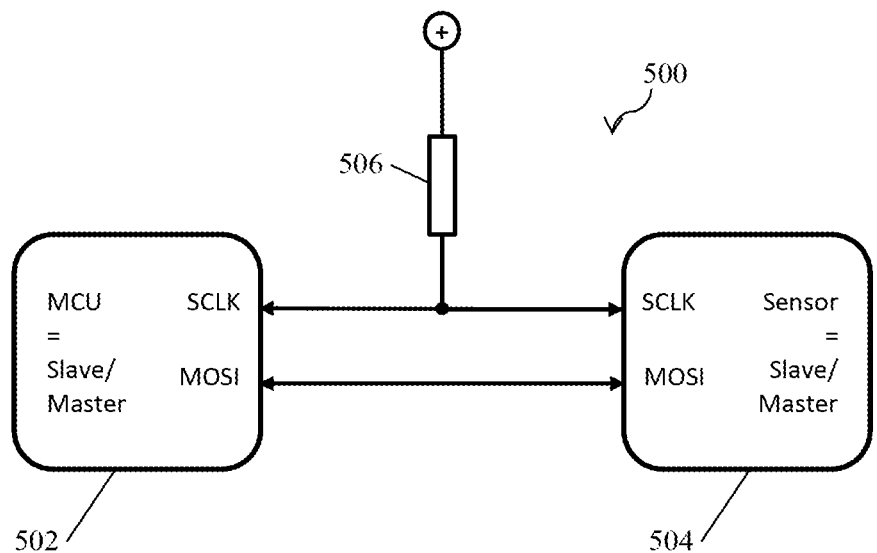
FIG. 5 shows a further illustrative embodiment of a sensing system.

FIG. 5 shows a farther illustrative embodiment of a sensing system 500. The sensing system 500 comprises a microcontroller 502 and sensor module 504 that are communicatively coupled to each other via a clock (SCLK) line and a master-output-slave-input (MOSI) line. Both the microcontroller 502 and the sensor module 504 are configured to operate in a master mode and in a slave mode. The microcontroller 502 and the sensor module 504 are in the slave mode by default. More specifically, in a default mode both devices (i.e., the microcontroller 502 and the sensor module 504) may be configured in slave mode, with each device providing an active low signal generated by its general-purpose input output pin SS_CON to its slave select input \SS, which means that both terminals of the clock line SCLK are in input-mode (tri-state). The communication between the microcontroller 502 and the sensor module 504 may take place in the following way. In a first step the requesting device may, while in slave mode, pull the SCLK line to clock-active-level which by default may be pulled up by a resistor 506 to clock-inactive-level. Pulling the SCLK line to clock-active-level may indicate an interrupt request to the receiving device. In a second step the device that receives such an interrupt request may wake up and may prepare for receiving data. In a third step the interrupt requesting device may calculate the expected data transmission duration based on the number of bytes to be transmitted, switch into master by de-asserting the slave select from its own SPI block, while it may be assured that the interrupt requesting device stays sufficiently long in master mode for assuring proper SPI communication. The loop from the general-purpose input output pin SS_CON to the slave select input \SS indicates that the existing interface signals of the existing SPI block are stimulated by an additional SS_CON to control the standard slave_select signal. In a fourth step the interrupt requesting device may transmit its message to the receiving device. The message may comprise an indication of how much information is sent. In a fifth step the transmitting device may re-activate the slave select signal and may thus switch back to the slave mode.

Figure 6:
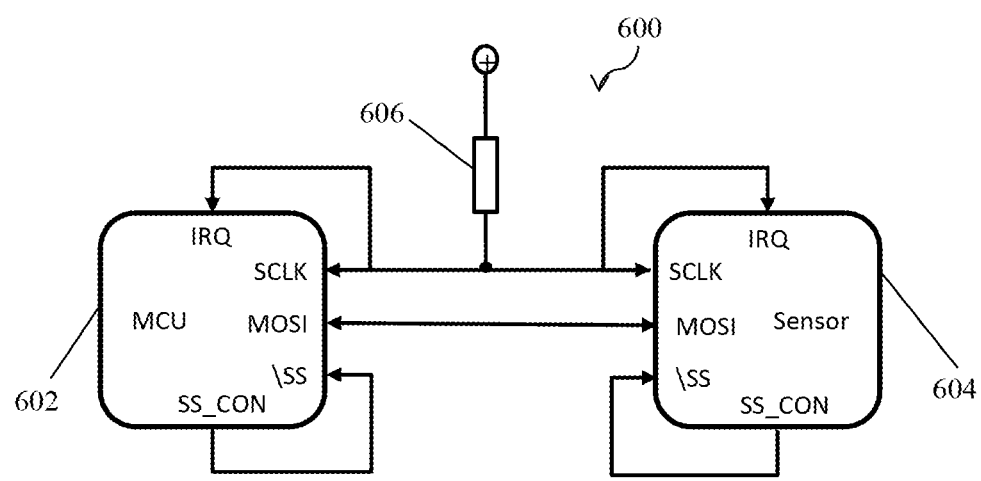
FIG. 6 shows a further illustrative embodiment of a sensing system.

FIG. 6 shows a further illustrative embodiment of a sensing system 600. The sensing system 600 comprises a microcontroller 602 and sensor module 604 that are communicatively coupled to each other via a clock (SCLK) line and a master-output-slave-input (MOSI) line. Both the microcontroller 602 and the sensor module 604 are configured to operate in a master mode and in a slave mode. The microcontroller 602 and the sensor module 604 are in the slave mode by default. The communication between the microcontroller 602 and the sensor module 604 may take place as described with reference to FIG. 5. This example shows how the SCLK is used to transmit an interrupt request IRQ to the microcontroller 602 or the sensor module 604, as the case may be. Furthermore, it shows how the microcontroller 602 or the sensor module 604 asserts a slave select to its own SN block (shown as an arrow from SS_CON to \SS).

Figure 7:
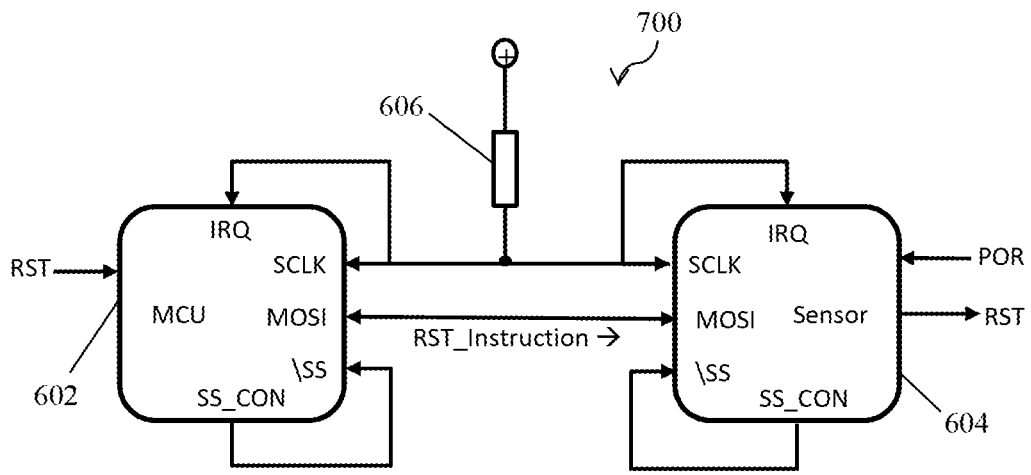
FIG. 7 shows a further illustrative embodiment of a sensing system.

FIG. 7 shows a further illustrative embodiment of a sensing system 700. In this embodiment, the microcontroller 602 is configured to transmit a reset instruction to the sensor module 604. Thereby, resetting the sensor module 604 may be simplified. In particular, for resetting the sensor module 604, a hardware reset may be replaced by a soft reset instruction communicated to the sensor module 604 by the microcontroller 602. In order to achieve this, the sensor module's SPI may have to be reset reliably by an external Power-On-Reset (POR) function to be able to receive the soft reset instruction under all conditions.

Figure 8:
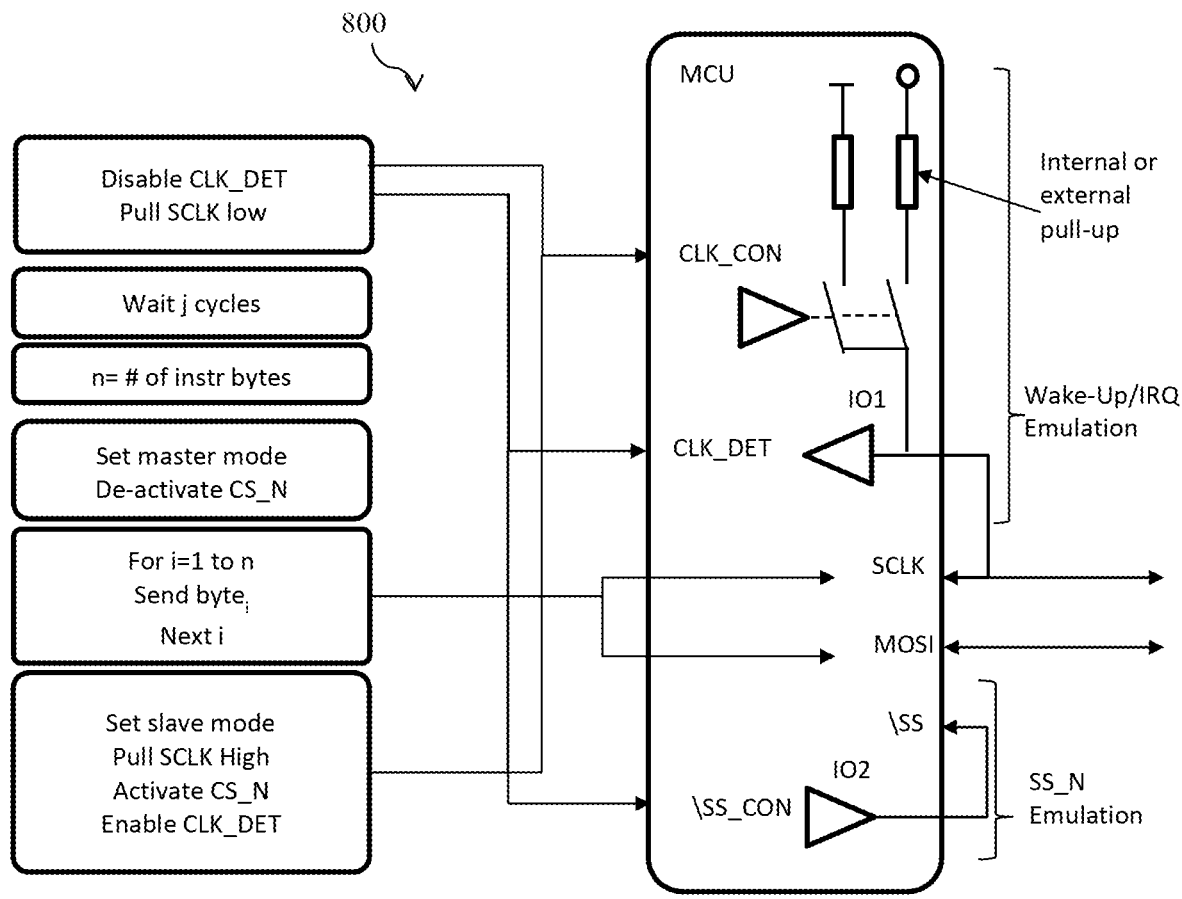
FIG. 8 shows an illustrative embodiment of flow control.

FIG. 8 shows an illustrative embodiment of flow control 800. In particular, an example implementation is shown of the total flow control of a microcontroller of the kind set forth. As shown, the pull-up of the SCLK line to clock-inactive-level may be made configurable so as to enable power saving during communication. Furthermore, both devices may be configured to switch off IRQ-sensing while in master mode to avoid unstable behavior. In other words, in an embodiment, each of the sensor module and the processing unit is configured to disregard interrupt requests when operating in the master mode. Thereby, unstable behavior of the sensing system may be avoided.

Figure 9:
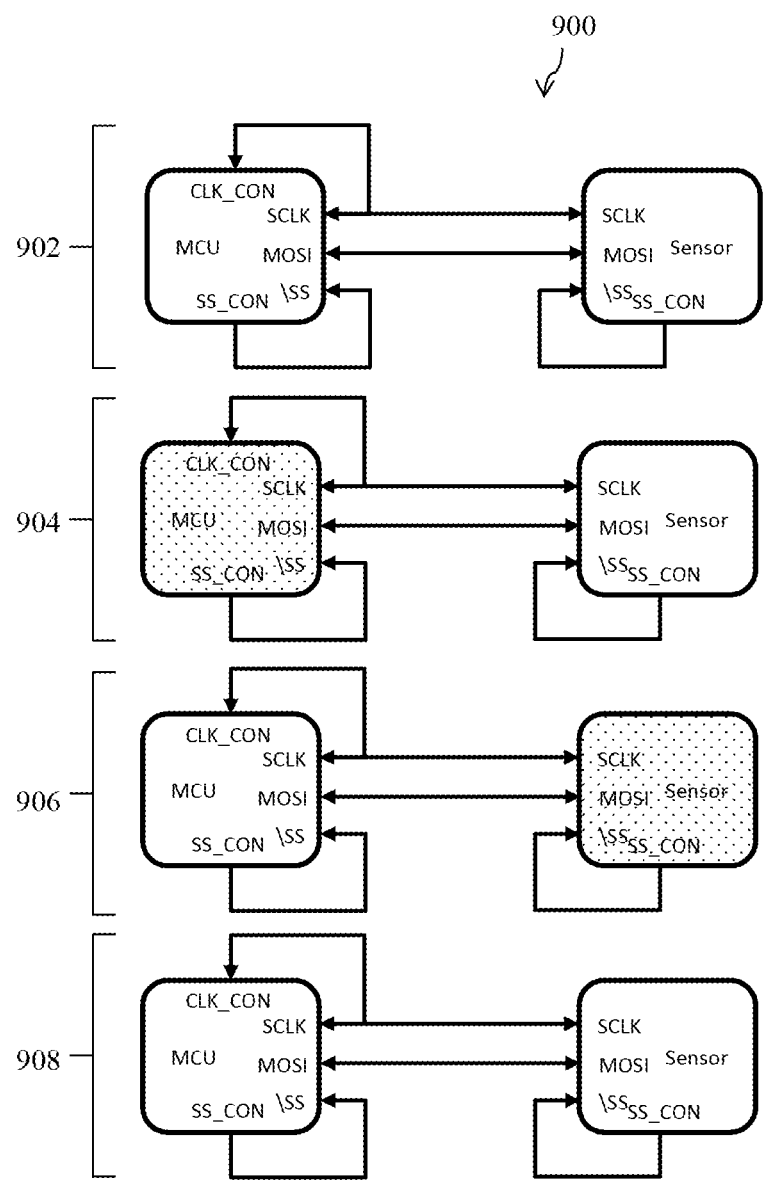
FIG. 9 shows an illustrative embodiment of a communication method.

FIG. 9 shows an illustrative embodiment of a communication method 900. As mentioned above, in an embodiment, the sensor module is configured to operate in the master mode during multiple data transmission cycles. In this way, delays caused by switching time overhead may be avoided. The duration of the master mode may again be derived from the expected number of data bytes to be sent to the receiving device. The sensor module may transmit an interrupt request to the microcontroller so that the microcontroller may wake up and receive new data. Operating in the master mode during multiple transmission cycles may be advantageous if the sensor module provides data in packets of a fixed number of bytes (e.g., 16 bytes). In that case, each data transmission cycle may include the transmission of said fixed number of bytes. In the example shown in FIG. 9, the microcontroller requests the sensor module to perform a certain operation, for example to transmit data resulting from a fingerprint sensing operation. Subsequently, the sensor module performs this operation.

In a first step 902, both the microcontroller and the sensor module operate in the slave mode. For example, as mentioned above, the SCLK line may by default be pulled up by a resistor to clock-inactive-level. Optionally, the sensor module may be in a pre-defined sleep mode.

In a second step 904, the microcontroller may be switched by a computer program to the master mode. More specifically, a process comprising y cycles may be started. If y=1, and an instruction is ready, the microcontroller pulls the SCLK line low (i.e., to clock-active-level) with its own SCLK detection disabled. Furthermore, the microcontroller is set as master for a duration of x*y bytes. If y>1, and the instruction is ready, the microcontroller pulls the SCLK line low (i.e., to clock-active-level) with its own SCLK detection disabled. Optionally, if the sensor module is in the sleep-mode, it may wake up in response to the SCLK being pulled low, and the microcontroller may wait n cycles for the sensor module to wake up. Next, the microcontroller sends x instruction bytes. Subsequently, the process of y cycles may end, and the microcontroller may pull the SCLK line high again (i.e., to clock-inactive-level) and switch back to the slave mode. Optionally, the microcontroller may enter into a sleep mode.

In a third step 906, the sensor module may switch to the master mode. More specifically, a process comprising y cycles may be started. If y=1, and a response is ready, the sensor module pulls the SCLK line low (i.e., to clock-active-level) with its own SCLK detection disabled. Furthermore, the sensor module is set as master for a duration of x*y bytes. If y>1, and the response is ready, the sensor module pulls the SCLK line low (i.e., to clock-active-level) with its own SCLK detection disabled. Optionally, if the microcontroller is in the sleep-mode, it may wake up in response to the SCLK being pulled low, and the sensor module may wait n cycles for the microcontroller to wake up. Next, the sensor module sends x response bytes. Subsequently, the process of y cycles may end, and the sensor module may pull the SCLK line high again (i.e., to clock-inactive-level) and switch back to the slave mode. Optionally, the sensor module may enter into a sleep mode.

In a fourth step 908, both the microcontroller and the sensor module operate in the slave mode again.

In an embodiment, the microcontroller may be made master of the flow control by giving it control over the start of a communication, while the sensor module is always configured to provide a response to a received instruction without having the option to stop sending responses. Furthermore, in an embodiment, the microcontroller may calculate a time interval using information contained in the instruction message. Within said time interval the microcontroller may expect a response from the sensor module. If no response is received within this time interval, the microcontroller may react by issuing a soft reset instruction to the sensor module, for example. It is furthermore noted that the presently disclosed system and method may support all SPI modes (i.e., modes 0, 1, 2 and 3).

Figure 10:
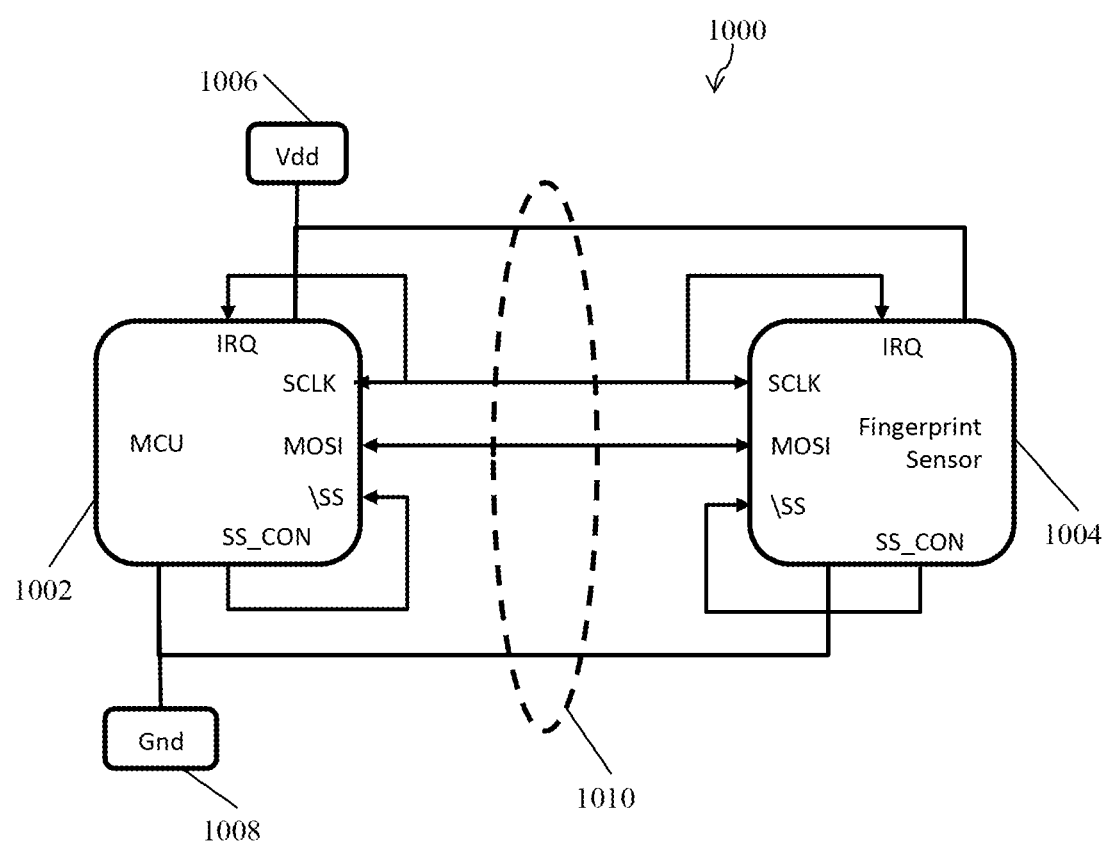
FIG. 10 shows a further illustrative embodiment of a sensing system.

FIG. 10 shows an illustrative embodiment of a sensing system 1000. The sensing system 1000 comprises a microcontroller 1002 communicatively coupled to a fingerprint sensor 1004. Both the microcontroller 1002 and the fingerprint sensor 1004 are connected to a supply voltage 1006 and to ground 1008. In accordance with the present disclosure, the microcontroller 1002 and the fingerprint sensor 1004 are configured to communicate with each other via a serial peripheral interface (SPI) in a half-duplex mode of communication, using only a SCLK line and a MOSI line. Thus, the sensing system 1000 may in total require four interconnections: a SCLK line, a MOSI line, and two power lines (Vdd, Gnd). Thus, the number of interconnections between the microcontroller and the fingerprint sensor is significantly reduced.

The presently disclosed system and method may at least partly be executed by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form. The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 sensing system
102 microcontroller
104 sensor module
106 supply voltage
108 ground
200 sensing system
202 microcontroller
204 sensor module
300 sensing system
302 microcontroller
304 sensor module
306 first direction
308 microcontroller
310 sensor module
312 second direction
400 timing diagram of an SPI
500 sensing system
502 microcontroller
504 sensor module
506 resistor
600 sensing system
602 microcontroller
604 sensor module
606 resistor
700 sensing system
800 flow control
900 communication method
902 first step
904 second step
906 third step
908 fourth step
1000 sensing system
1002 microcontroller
1004 fingerprint sensor
1006 supply voltage
1008 ground
1010 interconnections

The invention claimed is:

1. A biometric sensing system comprising:
   a sensor module;
   a processing unit communicatively coupled to the sensor module;
   wherein the sensor module and the processing unit are configured to communicate with each other in a half-duplex mode of communication, wherein the sensor module and the processing unit are communicatively coupled to each other via a serial peripheral interface, wherein both the sensor module and the processing unit are configured to operate in a master mode and in a slave mode, wherein the sensor module and the processing unit are configured to switch roles, and wherein each of the sensor module and the processing unit is configured to transmit an interrupt request on a clock line when no communication takes place.

2. The system of claim 1, wherein the serial peripheral interface comprises a clock line and a master-output-slave-input line.

3. The system of claim 1, wherein the processing unit is configured to transmit a reset instruction to the sensor module.

4. The system of claim 1, wherein the processing unit is configured to control the start of a communication.

5. A smart card comprising the system of claim 1.

6. The system of claim 1, wherein the sensor module and the processing unit are configured to operate in a slave mode by default.

7. The system of claim 6, wherein each of the sensor module and the processing unit is configured to switch to a master mode of operation.

8. The system of claim 7, wherein the duration of the master mode of operation depends on an amount of data to be transmitted.

9. The system of claim 7, wherein each of the sensor module and the processing unit is configured to switch back to the slave mode.

10. The system of claim 7, wherein each of the sensor module and the processing unit is configured to disregard interrupt requests when operating in the master mode.

11. The system of claim 7, wherein the sensor module is configured to operate in the master mode during multiple data transmission cycles.

12. A method of communicating between a sensor module and a processing unit in a biometric sensing system, wherein the sensor module and the processing unit communicate with each other in a half-duplex mode of communication, wherein the sensor module and the processing unit are communicatively coupled to each other via a serial peripheral interface, wherein both the sensor module and the processing unit operate in a master mode and in a slave mode, wherein the sensor module and the processing unit are configured to operate in a slave mode by default, and wherein the sensor module and the processing unit switch roles.

13. A computer program comprising non-transient executable instructions that, when executed by a sensor module or a processing unit, cause said sensor module and processing unit to carry out the method of claim 12.

* * * * *